United States Patent
Luhmann, Jr. et al.

(10) Patent No.: US 10,714,292 B2
(45) Date of Patent: Jul. 14, 2020

(54) METHOD OF FABRICATING TUNGSTEN SCANDATE NANO-COMPOSITE POWDER FOR CATHODES

(71) Applicant: THE REGENTS OF THE UNIVERSITY OF CALIFORNIA, Oakland, CA (US)

(72) Inventors: Neville C. Luhmann, Jr., Walnut Creek, CA (US); Gordon Soekland, Rocklin, CA (US); Diana Gamzina, West Sacramento, CA (US); Na Li, Davis, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 386 days.

(21) Appl. No.: 15/665,659

(22) Filed: Aug. 1, 2017

(65) Prior Publication Data
US 2017/0358419 A1    Dec. 14, 2017

Related U.S. Application Data

(63) Continuation of application No. PCT/US2016/017198, filed on Feb. 9, 2016.
(Continued)

(51) Int. Cl.
*H01J 9/04* (2006.01)
*C04B 35/624* (2006.01)
(Continued)

(52) U.S. Cl.
CPC ............ *H01J 1/146* (2013.01); *C01G 41/006* (2013.01); *C04B 35/50* (2013.01); *C04B 35/624* (2013.01);
(Continued)

(58) Field of Classification Search
CPC .............................. C04B 35/624; H01J 1/142
See application file for complete search history.

(56) References Cited

U.S. PATENT DOCUMENTS 6,677,175 B2  1/2004  Zhao
7,722,804 B2  5/2010  Wang
(Continued)

FOREIGN PATENT DOCUMENTS

CN    1304152 C  *  3/2007
CN    1304152 C     3/2007
(Continued)

OTHER PUBLICATIONS

CN 1304152 C (Wang) Mar. 14, 2007 (English language machine translation) . [online] [retrieved Oct. 15, 2019]. Retrieved from: Google Patents. (Year: 2007).*
(Continued)

*Primary Examiner* — Erin Snelting
(74) *Attorney, Agent, or Firm* — O'Banion & Ritchey LLP; John P. O'Banion

(57) ABSTRACT

Methods for fabricating refractory metal scandate nanocomposite powders with homogeneous microstructured refractory metal grains and a uniform nanosized dispersion of scandia are provided. The powders prepared by the sol-gel methods have a spherical morphology, a narrow distribution of particle sizes and a very uniform dispersion of nanosized scandia particles joined to the tungsten grains. The powder particle sizes can range from nanometers to micrometers. The powders can be pressed into porous cathode structures that can be impregnated with emissive materials to produce high current density and long life cathodes for high-power terahertz vacuum electron devices. The sol-gel fabrication methods allow control over the materials, particle size,
(Continued)

particle composition and pore size and distribution of the cathode structure by manipulation of the process parameters.

10 Claims, 3 Drawing Sheets

Related U.S. Application Data

(60) Provisional application No. 62/114,482, filed on Feb. 10, 2015.

(51) Int. Cl.
    *C04B 35/626* (2006.01)
    *C04B 35/64* (2006.01)
    *C04B 35/495* (2006.01)
    *C04B 35/50* (2006.01)
    *H01J 1/146* (2006.01)
    *H01J 1/142* (2006.01)
    *C01G 41/00* (2006.01)

(52) U.S. Cl.
CPC ...... *C04B 35/6261* (2013.01); *C04B 35/6268* (2013.01); *C04B 35/62655* (2013.01); *C04B 35/64* (2013.01); *H01J 1/142* (2013.01); *H01J 9/04* (2013.01); *C01P 2004/64* (2013.01); *C01P 2006/40* (2013.01); *C04B 2235/326* (2013.01); *C04B 2235/3208* (2013.01); *C04B 2235/3215* (2013.01); *C04B 2235/3222* (2013.01); *C04B 2235/3224* (2013.01); *C04B 2235/5454* (2013.01); *C04B 2235/96* (2013.01)

(56) References Cited

U.S. PATENT DOCUMENTS

2004/0192547 A1* 9/2004 Takeishi .................. B01J 21/04
    502/331
2008/0025864 A1* 1/2008 Wang .................. C01G 41/006
    419/19
2013/0105742 A1* 5/2013 Wang ...................... H01J 1/142
    252/515

FOREIGN PATENT DOCUMENTS

| CN | 100433225 C | | 11/2008 |
|---|---|---|---|
| CN | 101834106 A | * | 9/2010 |
| CN | 101834106 A | | 9/2010 |
| EP | 1452230 A1 | | 9/2004 |

OTHER PUBLICATIONS

ISA/US, United States Patent and Trademark Office (USPTO), International Search Report and Written Opinion dated Apr. 22, 2016, counterpart PCT international application PCT/US2016/017198, pp. 1-11, with claims searched, pp. 12-16.

Zhao, Jinfeng et al., "High Current Density and Long Life Composite Scandite Dipsenser Cathode Fabrication", 10th International Vacuum Electronics Conference (IVEC2009), Apr. 28-30, 2009, (slides), pp. 1-27.

Barik, R.K. et al., "A novel approach to synthesis of scandia-doped tungsten nano-partices for high-current-density cathode applications", Int. Journal of Refractory Metals and Hard Materials 38 (2013) 60-66, May 2013.

Zhao, Jinfeng et al., "Scandia-added Tungsten Dispenser Cathode Fabrication for THz Vacuum Integrated Power Amplifiers", Terahertz Science and Technology, vol. 4., No. 4, Dec. 2011, pp. 240-252.

Zhao, Jinfeng et al., "Scandate Dispenser Cathode Fabrication for a High-Aspect-Ratio High-Current-Density Sheet Beam Electron Gun", IEEE Transactions on Electron Devices, vol. 59, No. 6, Jun. 2012, pp. 1792-1798.

Zhao, Jinfeng et al., "Scandate-added Tungsten Dispenser Cathode Fabrication for 220 GHz Sheet Beam Traveling Wave Tube Amplifier", Vacuum Electronics Conference (IVEC), 2012 IEEE Thirteenth International, Apr. 24-26, 2012, pp. 47-48.

Gamzina, Diana, "Machining Methods for Nano-Composite Scandate Tungsten Cathodes", University of California, Davis, Thesis, ProQuest Dissertations Publishing, Jun. 2012, UMI No. 1519690, pp. 1-74.

* cited by examiner

METHOD OF FABRICATING TUNGSTEN SCANDATE NANO-COMPOSITE POWDER FOR CATHODES

CROSS-REFERENCE TO RELATED APPLICATIONS

This application is a 35 U.S.C. § 111(a) continuation of PCT international application number PCT/US2016/017198 filed on Feb. 9, 2016, incorporated herein by reference in its entirety, which claims priority to, and the benefit of, U.S. provisional patent application Ser. No. 62/114,482 filed on Feb. 10, 2015, incorporated herein by reference in its entirety. Priority is claimed to each of the foregoing applications.

The above-referenced PCT international application was published as PCT International Publication No. WO 2016/0130580 on Aug. 18, 2016, which publication is incorporated herein by reference in its entirety.

STATEMENT REGARDING FEDERALLY SPONSORED RESEARCH OR DEVELOPMENT

This invention was made with Government support under Grant No. G8U543366 awarded by DARPA; Grant Nos. N00164-06-D-8958 and N66001-11-C-2003 awarded by DOD/MTO/DARPA; and Grant Nos. FA9550-04-0101 and FA9550-04-1-0353, awarded by the USAF/AFSOR. The Government has certain rights in this invention.

INCORPORATION-BY-REFERENCE OF COMPUTER PROGRAM APPENDIX

Not Applicable

BACKGROUND

1. Technical Field

The present technology pertains generally to devices and methods for electron streaming cathodes and, more particularly, to methods for fabricating nanoscale refractory metal-scandate composite powders and methods for the production of cathodes that have a high current density, low work function and a long lifespan.

2. Background

Cathodes are used as a source of electrons in a wide variety of devices. The energy from electron beams can be converted into electromagnetic radiation that can be used for many communications, radar, spectroscopy, medical treatment and research applications. The cathode is often the performance limiting component in high frequency linear beam amplifiers such as traveling wave tubes and klystrons. Likewise, the performance and reliability of microwave tubes depends largely on the quality of the cathode. A high quality source of a beam of electrons is required for each of these devices to efficiently perform their respective functions.

There are a number of cathode emission mechanisms. The most widely known are thermionic, field emission, photoemission, and secondary emission mechanisms. Thermionic emission is the emission of charged particles (electrons or ions) from the surface of the emitter due to heating. Field emission is the emission of electrons from a surface due to the presence of a sufficiently high electrostatic field. Photoemission of electrons by matter is caused by absorption of energy from visible or ultraviolet radiation. The emission of electrons due to charged particles with high energy hitting a surface is called secondary electron emission.

The production of a high quality beam from a cathode by thermionic emission has primarily two requirements. The first requirement is to provide a suitable support structure, heater, and shielding so that the entire emitting surface of the cathode is uniformly heated to a sufficient operating temperature. Thermionic emission of electrons from the surface of certain metals occurs when it is heated uniformly to a high temperature.

The second requirement that must be addressed for any type of cathode is control over the uniformity of the work function of the emitting surface. The work function is a property of the emitting surface and is the minimum energy applied to the cathode material that is needed to remove an electron from the cathode surface in a vacuum. Because it is a surface property, the work function depends on the configuration of atoms at the emission surface of the cathode material. When the cathode is heated above a certain temperature, a large number of electrons receive energy greater than the work function of the cathode metal and thermionic emission begins. However, the work function of the cathode can be reduced if the cathode surface is coated with an electron emissive material.

Accordingly, the uniformity of the beam that is emitted from the cathode is determined by the uniformity of the temperature and work function of the emission surface of the cathode. Furthermore, the work function and temperature of a hot cathode are critical parameters that determine the amount of current that is emitted from the cathode surface.

The majority of conventional thermionic cathode designs are produced from the sintering of tungsten powder. Tungsten is a common material used for bulb filaments that can withstand high temperatures but has a relatively high work function (approximately 4.5 eV). The work function of a cathode material like tungsten, for example, can be reduced by coating the tungsten with a material that has a lower work function such as barium oxide. The application of such emission materials to the tungsten material will allow lower operating temperatures and result in the production of cathodes that are capable of providing extremely high current densities and a longer lifespan.

The manufacturing process of a typical cathode includes the steps of tungsten powder selection, powder pressing and sintering, impregnation with a polymer for ease of machining, machining, polymer removal and impregnation with emission materials. Conventional tungsten cathodes are produced by compressing tungsten powder into pellets or cylinders and then sintering the formed material in a high temperature furnace, typically at over 2000° C. for 1-2 hours. The tungsten matrix is then filled with ceramic-like emission materials.

However, the current density capacity, emitting surface work function and lifespan of commercially available cathodes are limited and they do not produce an adequate amount of current density to build high power devices. These performance limitations are due to the microstructure characteristics of the tungsten matrix of the cathode.

An uneven pore distribution in the sintered tungsten matrix is caused by uneven and irregular particle shapes and sizes. Commercially available tungsten powders have a wide size distribution of irregularly shaped particles as well as large agglomerations that may require grinding and sieving to eliminate the agglomerations before the powders can be used. Conventional sintered tungsten rods can vary in porosity from 15% to 30%. Although the porosity of the cathode pellets is influenced in part by the initial grain size of the tungsten powder, the wide variation is particle sizes and irregular particle shapes do not allow precise control over the porosity of the pellet as a result.

Furthermore, the variation in pore sizes and distribution of the tungsten pellet and the lack of uniformity of the open pores directly influences the uniformity and amount of the emissive barium compounds that can diffuse into the pellet matrix and the electron emission capability of the cathode. While the barium compound will diffuse into the tungsten pellet matrix, there is no direct control of the uniformity and amount of the compound that is impregnated. As a result, the cathode emission surface acquires a random amount of emissive compounds that directly influence the work function of the emission surface.

During use, barium is continuously resupplied to the emission surface of the cathode via the porous tungsten matrix. As the barium supply is depleted, the emissions decrease and the cathode eventually becomes inoperative. Since pore diameters can vary between 1 to 7 microns and particle sizes can vary between 2 and 14 microns, there are areas on the cathode where the emission material that is being resupplied by a small pore will not be sufficient to cover a bigger tungsten particle with emissive materials during use. Accordingly, in conventional cathodes there is a balance between emission current density and the life of the cathode: the higher the current density, the faster the barium supplies will be depleted.

The next step of the fabrication process is the shaping of the pellet into the desired cathode shape and the machining of the emitting surface. The sintered tungsten pellets may be filled with an inert polymer that supports the fragile structure and serves as a lubricant during machining. However, the machining of the impregnated porous cathode pellet can often result in chipping and smearing of metal over the pores of the emission surface.

Because cathode emission is very sensitive to contamination, it is extremely important to remove the support polymer from tungsten matrix completely after machining. Any remaining polymer can leave a carbon residue within the cathode matrix and poison the cathode so that it would either not emit electrons at all, or it will have a very short lifespan.

The tungsten matrix is typically impregnated with barium emission materials by melting the barium materials into the matrix at around 1700° C. in a hydrogen atmosphere. After the cathode is impregnated, excess emissive material is removed and cleaned and the cathode may also undergo minor machining to assure the cathode is within engineering tolerances. The emission surface is often left untouched after impregnation to avoid any contamination.

There is a need for improved processes and procedures that can be used in the production of cathodes that have a high current density, low work function and long lifespan. There is also a need for methods of producing uniform metal powders and porous microstructures. The present technology satisfies this need as well as others and is generally an advancement in the art.

BRIEF SUMMARY

Commercially available cathodes do not produce an adequate amount of current density to build sensible high power devices. For example, typical commercially available cathodes produce 2 to 8 $A/cm^2$ of current density, with the lifespan being limited to just 1,000 hours at the higher end of emission density. In contrast, the scandate tungsten nano composite cathodes produced using the new technology described herein can produce over 100 $A/cm^2$ and demonstrating life of over 20,000 hours.

The present technology provides a process for manufacturing tungsten Scandate nano-composite powders and formed structures that can be used to produce high current density and long-life cathodes. By way of example, and not of limitation, the process uses a sol-gel method for manufacturing tungsten oxide and scandia nano-particles that are then reduced to pure tungsten-scandate powder. The powder is then pressed into a pellet, sintered, impregnated and used as an electron source (cathode) in a variety of devices.

The powders prepared by the sol-gel methods have a narrow distribution of particle sizes and a very uniform dispersion of nanosized Scandia particles joined to the tungsten grains. The powder particle sizes can range from nanometers to micrometers and can be controlled by adjusting the sol-gel processing parameters. The scandia concentration in the processed powders can also be controlled. Consequently, the parameters of the densified cathode matrix structures that can be fabricated from the powders can be controlled to have high porosity, uniform grain size and scandia distribution, and open pore distribution.

In one preferred embodiment, ammonium metatungstate and scandium nitrate are dissolved in deionized water and combined. Citric acid and ethylene glycol are added to the solution. The resulting solution is gently heated to create a gel-like system containing liquid and solid phases. A drying process follows to densify the gel. The dried gel is then fired to burn off any remaining organics. The produced tungsten oxide intermixed with scandia powder is then reduced in a hydrogen atmosphere to pure tungsten-scandia nanocomposite powder. The powder is then pressed into a desired shape by applying a uniaxial load and sintered in a hydrogen atmosphere to create a porous nanocomposite scandate tungsten matrix within a formed cathode. The porous tungsten matrix is preferably impregnated with an emissive material that has a lower work function than the metal powers such as thorium oxide, strontium oxide or barium oxide.

After the powder is produced, sintered into a pellet, and impregnated with emissive materials, the structure can be machined to provide a cathode with desired shapes to fit into many different devices such as an electron gun. The uniform cathode matrix structure makes the emission surface acquire a more uniform distribution of emissive material (e.g. barium, oxygen, and scandium), thereby improving the emission uniformity and lowering the work function of the emission surface and the cathode is more resistive to ion bombardment.

The resulting cathodes can be produced in desired shapes to fit into specific electron gun configurations and other applications. These cathodes have high current emission and can be machined with high tolerance and required surface finish for the intended engineering applications.

The cathodes are particularly suited for high frequency microwave sources because currently commercially available cathodes do not produce adequate current densities for these applications. For example, an electron gun can be used in a microwave tube as a source of electrons. High frequency microwave devices include applications in military (i.e. radar), communications (satellites), medical imaging (soft tissue), plasma fusion diagnostics (density and temperature). Scandate tungsten nano-composite cathodes enable the advancement of microwave sources bridging the "Terahertz gap." The electron guns can also be used in a variety of applications including electron microscopes, electron beam lithography, electron beam welding, etc.

According to one aspect of the technology, a new process is provided for manufacturing tungsten scandate nano-composite powders with homogeneous microstructured tungsten grains and a uniform nanosized dispersion of scandia.

Another aspect of the technology is to provide an efficient process for producing high current density and long-life cathodes for high-power terahertz vacuum electron devices.

It is also an aspect of the technology to provide a method of fabrication that allows control over the material particle size, particle composition and pore size and distribution by manipulation of the process parameters.

A further aspect of the technology is to provide a cathode material that is comparatively inexpensive to produce and simple to use with existing industrial scale systems.

Further objects and aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawing which is for illustrative purposes only.

DETAILED DESCRIPTION

Referring more specifically to the drawings, for illustrative purposes, embodiments of the separation media and methods for rare earth element separations are generally shown. Several embodiments of the technology are described generally in FIG. 1 through FIG. 3 to illustrate the products and methods. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
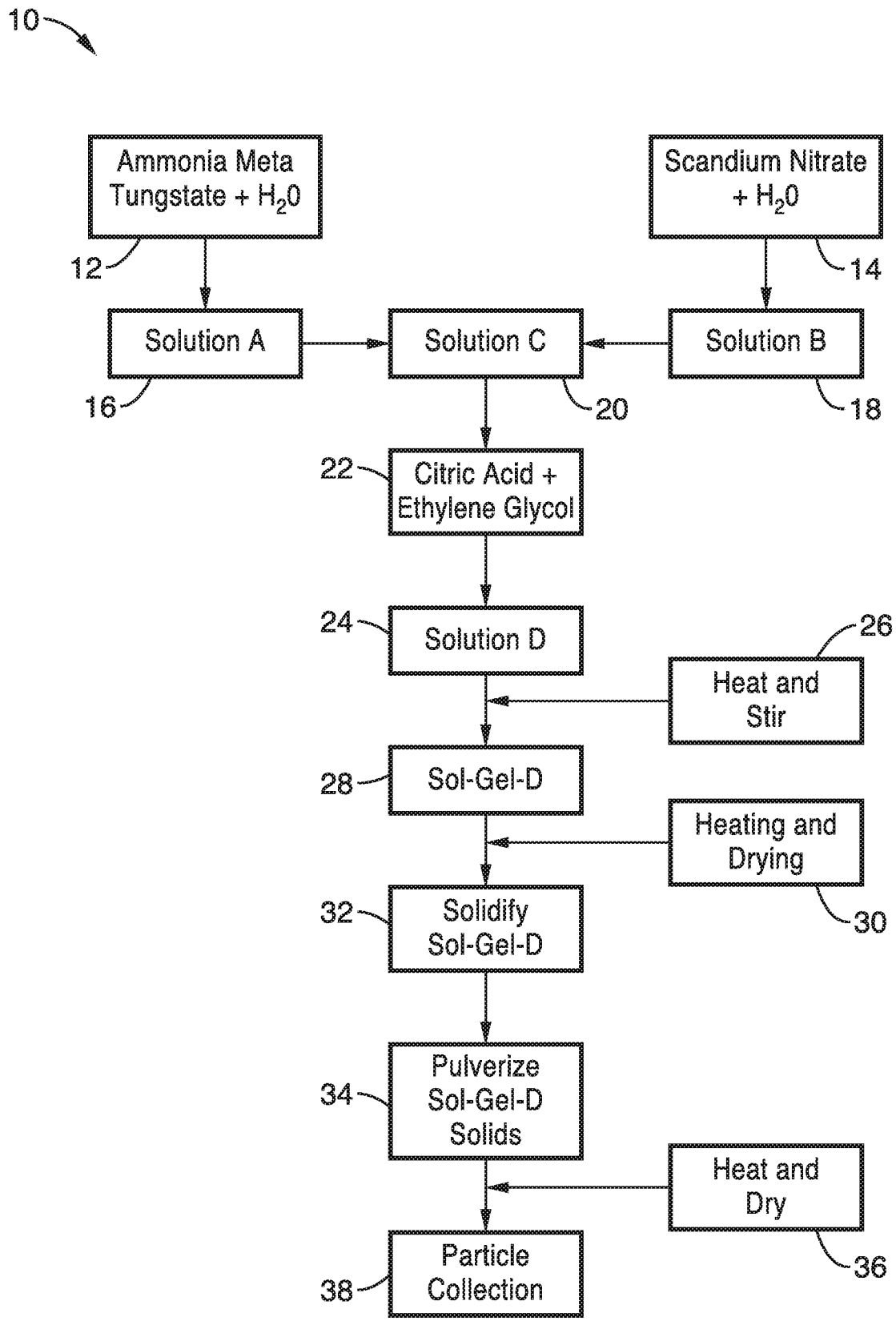
FIG. 1 is a flow diagram of a sol-gel synthesis scheme for producing tungsten scandate nano-composite powders according to one embodiment of the technology.

Turning now to FIG. 1, one preferred embodiment of a nanocomposite scandate tungsten powder fabrication method 10 according to the technology is generally described. The fabrication process using the sol-gel method for produces tungsten oxide and scandia nano-particles that are subsequently reduced to pure tungsten-scandate powder. Although the methods are illustrated with the production of tungsten, it will be seen that the methods can be adapted to the use of other refractory metals such as molybdenum, niobium, tantalum and rhenium. These metals have resistance to high heat, corrosion resistant and are electrically conductive.

Conventional tungsten powders that are available commercially are irregularly shaped and have a wide size distribution and contain large agglomerations and very fine particles that must be removed before use. These characteristics create cathodes with variable pore sizes and distribution resulting in poor emission uniformity and reproducibility.

Figure 3:
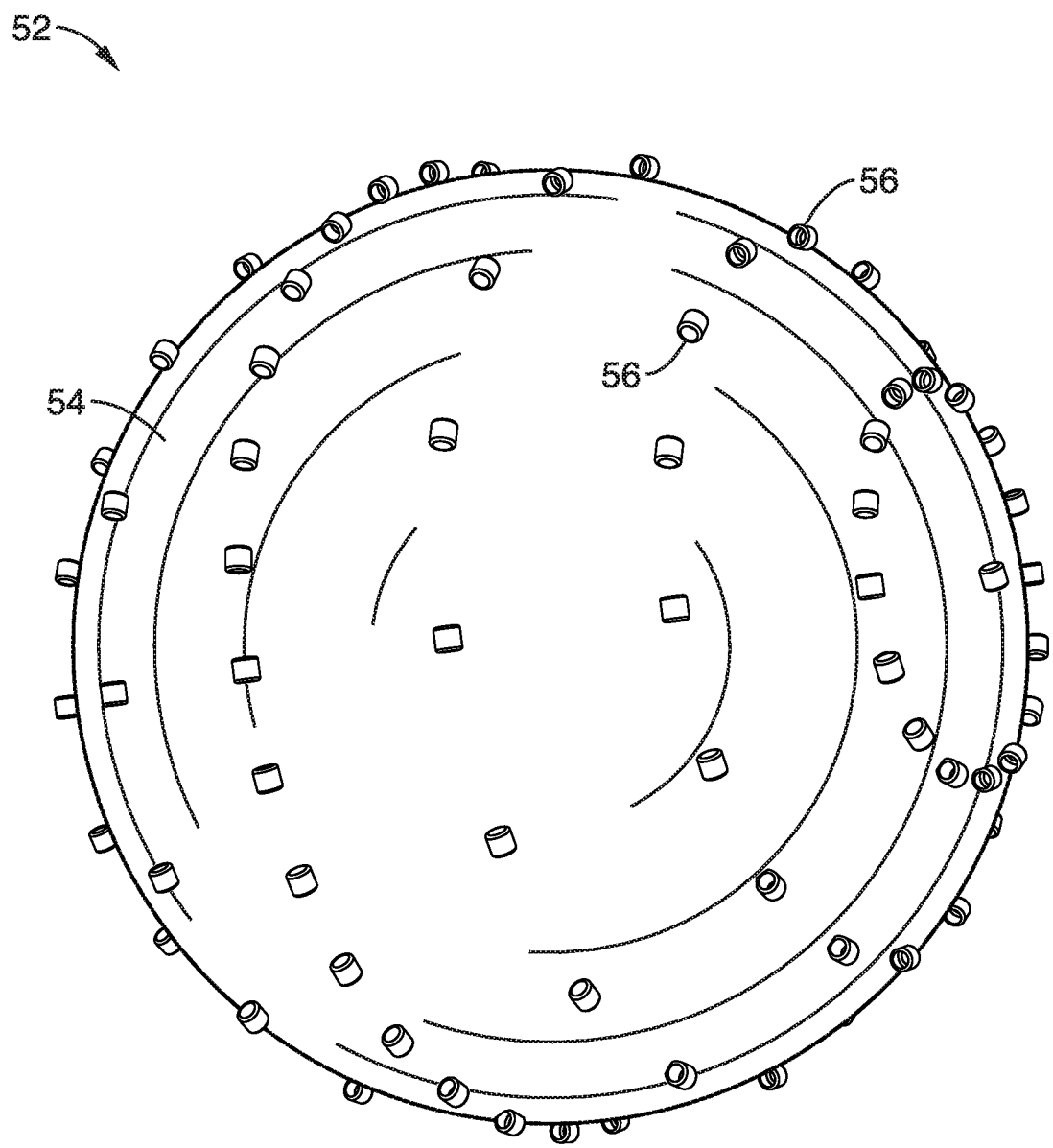
FIG. 3 is a schematic diagram of a representative tungsten particle coated with scandia nanoparticles (not to scale).

In comparison, the present technology provides a uniform particle distribution of spherically shaped metal powder grains with a uniform nanosized dispersion of scandia as shown schematically in FIG. 3. Microcomposite scandate dispenser cathodes with a generally homogeneous porous microstructure of tungsten grains and a uniform nanosized dispersion of scandia have also be fabricated to illustrate the methods.

Figure 2:
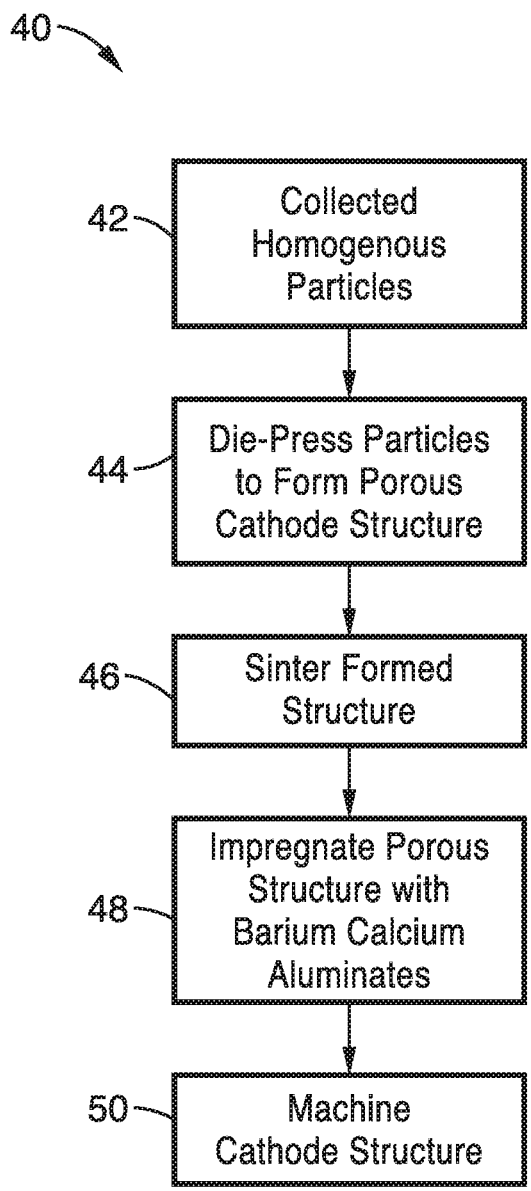
FIG. 2 is a is a flow diagram of a fabrication scheme of a microcomposite scandate dispenser cathode with a porous homogeneous microstructure of tungsten grains and a uniform nanosized dispersion of scandia and pores impregnated with an emission material according to one embodiment of the technology.

The microstructure of the cathode matrix is improved not only with nanosized scandia distribution but also with an extremely uniform tungsten particle distribution by carefully controlling sol-gel processing of the methods described in FIG. 1 and FIG. 2.

Initially, the starting materials are weighed and prepared. In this illustration, to make about 20 g of nanocomposite 5% scandate tungsten powder one would start with 25.468 grams of ammonium metatungstate (AMT), 3.366 grams of scandium (III) nitrate, and 10-30 grams of citric acid. The weight of the scandium (III) nitrate can be adjusted accordingly to achieve a lower or higher percentage of scandia in the final powder. The ideal percentage of scandia is between 2% and 8% by weight. The use of ammonium metamolybdenate or with other similar refractory metal salts is considered herein as equivalent to the ammonia metatungstate material.

In the embodiment of the method 10 shown in FIG. 1, a refractory metal salt, in this case ammonia meta-tungstate $((NH_4)_6H_2W_{12}O_{40})$, is dissolved in deionized water at block 12 to produce Solution A at block 16. Typically 100 ml to 300 ml of deionized water is mixed with the prepared ammonium metatungstate and the solution is stirred to dissolve the salt.

Similarly, the scandium(III) nitrate hydrate, $(Sc(NO_3)_3xH_2O, 99.99\%)$, is dissolved in deionized water at block 14 to produce Solution B at block 18. In this illustration, 20 ml to 200 ml of deionized water are mixed with the scandium nitrate and stirred until the salt is dissolved into solution to provide Solution B.

Solution A of ammonium metatungstate and Solution B of scandium nitrate are then combined to produce Solution C at block 20. Citric acid monohydrate, $(C_6H_8O_7$—$H_2O$, 99.5+%), and ethylene glycol $(C_2H_6O_2)$ are then added to Solution C at block 22 to produce Solution D at block 24.

At block 26, Solution D is gently heated to create a gel-like system containing liquid and solid phases to produce Sol-Gel-D at block 28 of FIG. 1. This can normally be accomplished by placing the flask containing Solution D into an oil bath and heating the bath at temperatures ranging between 70° C. to 150° C. while continuing to stir the solution during this process. In one embodiment, the oil bath can be replaced by a water bath if uniform heating is achieved. Solution D is kept in the bath at this range of temperatures for up to 15 hours or until the solution has gelatinized thus producing Sol-Gel-D at block 28.

A drying process follows to densify the gel. The gel that is obtained at block 28 is heated and dried at block 30. In this illustration the gelatinized solution of block 28 can be placed into an air vented oven at temperatures ranging from 140° C. to 200° C. for 2 to 6 hours at block 30 to produce a solidified and dried gel at block 32.

The solidified and dried gel of block 32 is then pulverized into a fine powder at block 34. The pulverized dried gel powder of block 34 is then fired at block 36 to burn off the remaining organics. For example, the crushed materials can be placed into an air vented oven at temperatures ranging from 400° C. to 600° C. for 2 to 6 hours at block 36.

In another embodiment, at block 36 the powder of block 34 is reduced in a hydrogen atmosphere oven by holding the temperature range at 500° C. to 800° C. for 1 to 3 hours followed by an additional 1 to 3 hour hold time at temperatures ranging between 800° C. and 1,000° C.

Finally at block 38 the pure tungsten-scandia nanocomposite powder put into clean glass capsules and then move to an inert atmosphere of nitrogen or a vacuum to protect it from oxidation and water absorption. The powder can then be stored in the inert atmosphere until used to produce cathodes or other products.

The resulting composite particles 52 that are collected at block 38 are generally spherical in shape with an even distribution of nanoscale Scandia 56 on the outer surface of the tungsten particle 54 as shown schematically in FIG. 3. In other embodiments, the Scandia pieces are randomly distributed across the surface of the base metal particle.

The average size of the base tungsten particle 54 and Scandia pieces 56 of the composite particles 52 can be controlled with manipulations of the sol-gel fabrication parameters. The sol-gel method can be used to produce uniform nanosized tungsten-scandia grains with controllable Scandia percentages as well. For example, the controllable methods have been used to produce powders with uniform average particle sizes of 1 to 2 micrometers with Scandia particle sizes of ~72 nm, 146 nm, 272 nm, and 587 nm.

The present technology also provides a method 40 for preparing tungsten-scandium cathodes using uniformly shaped nanosized tungsten-scandia composite material to produce a porous matrix with a narrow distribution of pores that can be impregnated with emissive materials. In the embodiment shown in FIG. 2, microcomposite scandate dispenser cathode structures can be fabricated that have a homogeneous microstructure of tungsten grains with a uniform nanosized dispersion of Scandia. At block 42, tungsten-scandia powders with a narrow distribution of particle diameters can be produced using a sol-gel method like that described in FIG. 1 and collected for the formation of a cathode. The particle size, particle material composition, and particle uniformity can be selected and controlled with the particle fabrication process.

The quality of the porous cathode matrix is mainly determined in part by the tungsten-scandia grain size, shape, and particle distribution. The tungsten-scandate composite particles from block 42 are preferably 1 μm to 2 μm in diameter, generally spherical shape with a particle distribution that is very uniform, without any agglomeration.

In this embodiment, formulated tungsten-scandia powders with a uniform or a narrow range of particle diameters that were collected at block 42 are placed into a designed mold to produce a desirable sized and shaped cathode configuration.

In one embodiment, the selected tungsten powder that has been poured into the mold is then pressed isostatically using approximately 140 MPa at block 44 to form common shapes such as rods, disks or pellets of various diameters. In one embodiment, the produced powder is pressed at block 44 into a desired shape by applying pressure ranging from between about 1 ton/cm$^2$ to about 3 ton/cm$^2$ assuring that average pellet porosity is between about 20% and about 35%.

At block 46, the compressed rods or other forms are sintered to stabilize the formed structure. The porosity of cathode matrix, defined by open pores, pore size, and pore distribution, is a major controlling parameter in the ultimate functionality of the dispenser cathode. A uniform distribution of pores in a porous tungsten-scandia matrix can be obtained by selecting relatively mild sintering conditions under which powder particles can be bonded to one another. Strict sintering conditions at high temperatures where the tungsten powders are excessively sintered can cause the uniform pore distribution to deteriorate. In one embodiment, the tungsten-scandate powder with small nano sized scandia is sintered at very low temperature, less than 1200° C., for a porous matrix with 25% porosity. The cathode matrix after this low sintering temperature is quite fragile causing considerable problems if future machining and engineering of the cathode are needed.

Alternatively, in another embodiment, the compressed forms are sintered at high temperatures (over 2000° C.) in a hydrogen atmosphere at block 46. The sintered tungsten rods can vary in porosity from 15% to 30% in this embodiment. However, the scandia in the matrix remains around 50-100 nm, still retaining its nano size.

The prepared tungsten-scandate composite matrix that is produced at block 46 is then impregnated with an emissive material at block 48. Emissive materials typically are placed on a surface of the tungsten-scandate composite matrix and the material is then heated, melted and optionally pressed into the porosity of the matrix.

In one preferred embodiment, the electron emission active materials, barium calcium aluminates ($BaO$—$CaO$—$Al_2O_3$) with a molar ratio of 4:1:1 or 5:3:2 are impregnated into the tungsten matrix at block 48. For example, the matrices can be impregnated with barium calcium aluminates with a molar ratio of 4:1:1 at 1650° C. for 2 min in a hydrogen atmosphere. This results in the filling of the pores of the tungsten-scandia matrix with emission materials. The uniform cathode matrix structure makes the emission surface acquire a more uniform barium, oxygen, and scandium distribution, thereby improving the emission uniformity and lowering the work function of the emission surface. Although barium calcium aluminates are identified as a suitable emissive material, it will be understood that other emissive materials can be used such as barium and strontium oxides.

In another embodiment, the pressed powder matrix is mildly sintered at a temperature below 1000° C. Then the cathode structure is impregnated with an electron emissive material followed by sintering at a temperature greater than 1500° C.

At block 50 of FIG. 2, the impregnated matrix structure is cleaned and machined into the final cathode configuration. Various machining techniques known in the art can be applied to the impregnated porous tungsten structure and usually minimal smudging can be achieved. Because the cathode has a porous structure, care should be taken to machine the cathode surfaces to the final dimensions without smearing the open pores on the emission surface because a smeared emission surface will result in poor, low, and nonuniform electron emission. However, the cathode pellets can be successfully machined with high precision without altering or plugging the pores.

After the cathode is impregnated with barium calcium aluminate and machined at block 50, it should be kept in a controlled environment, i.e., vacuum or dry nitrogen. The emission materials are usually soluble in water and therefore exposure to air has to be limited. In addition, any contamination after impregnation will lead to a poor emission performance by the cathode.

The emission performance of various nanocomposite scandia-tungsten dispenser cathodes has also been tested for current density and lifespan. The tungsten-scandate cathodes have been shown to have excellent emission properties at lower operating temperatures compared to the traditional sintered tungsten dispenser cathodes, and consequently have a significantly longer life.

Cathodes that emit up to 180 Amps/cm$^2$ and have a lifetime of over 20,000 hours in pulsed operation have been produced. A space charge limited current density of 40 A/cm$^2$ at 850° C.$_{br}$, and 170 A/cm$^2$ at 1050° C. have been obtained by using 300-500 nm scandate (5.0 wt. %)-tungsten powders. Cathode life testing at a loading of 50 A/cm$^2$ has been conducted at 1050° C. for 10,680 hours with no sign of degradation.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the fabrication methods, a nanocomposite 5% scandate tungsten powder was produced, formed into a cathode structure and tested. In this example, about 25.468 grams of ammonium meta tungstate [(NH$_4$)$_6$H$_2$W$_{12}$O$_{40}$] was mixed with between 100 ml to about 300 ml of deionized water and the solution was stirred to with to dissolve the salt to produce a first solution. Then, about 3.366 grams of scandium (III) nitrate [Sc(NO$_3$)$_3$] was mixed with about 20 ml to about 200 ml of deionized water with scandium nitrate; stir the solution to dissolve the salt and produce a second solution. The weight of the scandium (III) nitrate can be adjusted accordingly to achieve a lower or higher percentage of scandia in the final powder. The preferred percentage of scandia is between about 2% and about 8% by weight.

The first and second solutions were combined in a flask and about 10 grams to about 30 grams of citric acid [C$_6$H$_8$O$_7$] and ethylene glycol, [99%, C$_2$H$_6$O$_2$], were added and mixed into the combined solutions.

The flask was placed into an oil bath and heated at temperatures ranging between about 70° C. to about 150° C. and the solution was stirred continuously during this process. (The oil bath can be replaced by a water bath if uniform heating is achieved.) The solution was kept in the bath at this range of temperatures for up to about 15 hours or until the solution had gelatinized.

Thereafter the gelatinized solution was placed into an air vented oven at temperatures ranging from about 140° C. to about 200° C. for about 2 hours to about 6 hours to solidify the gel. The solidified gel was then removed from the flask and crushed into a fine flour-like powder.

The crushed materials were then placed into an air vented oven at temperatures ranging from about 400° C. to about 600° C. for a range of about 2 hours to about 6 hours. The heat treated powder was then placed into a vacuum or nitrogen atmosphere to protect it from oxidation and water absorption upon removal from the oven.

The produced powder was then reduced in a hydrogen atmosphere in an oven by holding the temperature range at about 500° C. to about 800° C. for about 1 hour to about 3 hours followed by an additional heating at temperatures ranging between about 800° C. and about 1,000° C. for about 1 hour to about 3 hours of hold time. The process produced about 20 g of nanocomposite 5% scandate tungsten powder.

The resulting scandate tungsten powder was placed into a mold and the produced powder was pressed into a desired shape by applying pressure ranging between about 1 ton/cm$^2$ to about 3 ton/cm$^2$ assuring that average pellet porosity is between about 20% and about 35%. The porous structure and nanosized scandia distribution of the compressed pellets was then visually evaluated by scanning electron microscopy. The pellets were then sintered and impregnated with barium calcium aluminates. The structures were evaluated again using x-ray diffraction and scanning electron microscopy after additional processing to decompose any barium hydroxide or carbonate and to remove any water in the pores. The space charged limited current densities and lifespan of the cathodes that were fabricated from the pellets were also evaluated.

Example 2

To further demonstrate the technology, several quantities of ammonium metatungstate/(NH$_4$)6H$_2$W$_{12}$O$_{40}$ and scandium(III) nitrate/Sc(NO$_3$)$_3$ were weighed and mixed with deionized water and stirred to produce solutions. Specifically, 200 mL of deionized water was added to the ammonium meta tungstate in a 300 mL beaker and placed on a stirring plate and spun at 350 RPM's to dissolve the chemicals. Similarly, the scandium nitrate was placed in 100 mL of deionized water and then put on a stirring plate and spun at 350 RPM's to dissolve chemicals.

Equal parts ethylene glycol and citric acid/C$_6$H$_8$O$_7$ were mixed in a 50 mL beaker, first ethylene glycol and then the citric acid was added. The scandium and tungstate solutions were combined and placed into a 500 mL Erlenmeyer flask and then 20 grams of citric acid and ethylene glycol were immediately added to the Erlenmeyer flask.

A heated oil bath was prepared by filling a Pyrex beaker (No. 3140) with silicone oil halfway up the beaker and placed above a stir plate (Corning PC #420D). The heat oil bath was then heated to the desired temperature. One large paperclip was inserted in the center of the oil bath and the stirring plate was set to 300 rpm. This ensured that the temperature in the oil was evenly distributed around the flask during the dehydration step.

The 500 mL Erlenmeyer flask, with the mixed solution, was suspended approximately 0.5 inches above the bottom of the stirring plate. The oil bath treatment was performed at specified temperature for two hours.

After 2 hours, the oil temperature was raised and left until all of the ingredients were dry. The solution looked like foam and was slightly yellow in color indicating the powder had gelled correctly. Typically, this process took 15 hours to overnight. The material was then removed from the oil bath and the bottom of the 500 mL Erlenmeyer flask was cleaned thoroughly with acetone to get rid of the oil.

The cleaned flask and materials were then placed into the lab oven and the temperature set and run for powders to dry. The dried gel had turned yellow to brown in color and showed a few particles that were amber in color.

The material inside the beaker was removed by gently pounding on the solidified gel with a stainless steel scraping tool. Care was taken not to scrape the bottom or the sides of the beaker to avoid Si contamination. The material was transferred in batches (4 batches) into a mortar and each batch was crushed with a pestle for 20 minutes until all of the particles were uniform in size. The resulting powder was smooth and flour like. The powder was weighed and put into clean glass capsules and then moved to an inert atmosphere.

Thereafter the encapsulated crushed material was placed into rectangular alumina crucibles and transferred to the oven. The crucibles were only filled with powder half to three quarters full to avoid spilling over in the oven. The crucibles were placed in the preheated oven for 3-6 hours.

The oven was then shut off and the powder was left inside the oven with the door closed for 30 minutes until it cooled. The powder appeared yellow in color and was immediately put in a nitrogen box for storage after weighing.

A flat molybdenum crucible boat was cleaned with acetone and isopropyl alcohol only. A pre-weighed amount of the scandium-tungsten powder was spread evenly and thinly along the bottom of the molybdenum crucible boat. The powders were centrally located in the crucible boat creating a two inch long strip to be located within the central heating area of the oven.

The molybdenum boat was placed into a transparent quartz tube and the hydrogen lines were secured on both ends of the quartz tube. The tube was then placed inside of the tube furnace. Initially the hydrogen flow rate was opened to 30 mm/min for 10 minutes while bubbles were monitored to make sure hydrogen was purging. After 10 minutes, the cover of the tube furnace was closed and the temperature controller was adjusted to 25° C. At this time, the hydrogen flow rate was in the range of 3 mm/min to 50 mm/min for the entire heating cycle.

The temperature was raised from 25° C. slowly to the desired temperature of 650° C. The ramp time was set for 30 minutes (20° C./min ramp rate) for the increase to 650° C. This temperature was held for two hours and then the temperature was raised to the second temperature point of about 900° C. with a ramp time of about 10 minutes. The material was held at the second temperature for another two hours. Then, the temperature was reduced to 300° C. and the door to the oven opened until the oven temperature fell to ~100° C. at which time the quartz tube had cooled enough to handle.

The powder was removed from the quartz tube and put into clean glass capsules and an inert atmosphere in preparation for pellet formation or other uses. Pellets were formed by first weighing out $Sc_2O_3$—W powder and placing it in a cold pellet press tool and applying a calculated pressure to create the pellet. After cold pressing the powders into a pellet, the pellet was transferred to the oven and sintered under hydrogen atmosphere to achieve the proper porosity.

Once the sintering operation was complete, the porosity value of the pellets was found using the equation: $\varphi=1-(Mp/Mr)\times 100\%$, where $Mr=\rho \times V$ and where Mp=Weighted Mass on Scale. The pellets were then shaped to the desired length using a small lathe.

Example 3

To illustrate the electron beam emission characteristics of the structure, a microcomposite scandate dispenser cathode was prepared and evaluated. The prepared porous tungsten scandate pellets were impregnated with barium-calcium-aluminates with a molar ratio of 4:1:1. This resulted in the filling of the pores of the tungsten matrix with emission materials.

Initially, the barium nitrate/$Ba(NO_3)_2$, calcium nitrate/$Ca(NO_3)_2$ and aluminium nitrate hydrate/$Al(NO_3)_3 \cdot XH_2O$ starting materials were prepared in the proper molar ratios. The starting impregnation materials (5.115 grams of barium nitrate, 1.1505 grams of calcium nitrate and 3.659 grams of aluminum nitrate hydrate) were added to 180 mL of deionized water in a 500 mL beaker to produce a solution. The solution was stirred at 200 RPM's to dissolve and mix things thoroughly.

An ammonium carbonate ($CH_8N_2O_3$) solution was added dropwise to the solution of impregnation materials while stirring the solution until a precipitate formed. After all of the ammonium carbonate solution was added to the impregnation materials, ~300 mL of solvent was removed and placed into several centrifuge tubes and spun in the centrifuge. Once the centrifuge cycle was complete, the remaining pellet was mixed with ten mL of DI water and repeated.

After cleaning the samples, the pellets were collected and the 411 powders were dried in the oven. The dried materials were collected and prepared for use as an impregnation material for the tungsten matrix. First the 411 material was annealed by heating the powders in air at high temperature for several hours and allowed to cool slowly. Second, the 411 powders were heated again in an oven to transform carbonates into oxides at temperature ranging between 1000° C. and 1700° C.

Subsequently, the tungsten matrices were impregnated with the annealed 411 barium-calcium-aluminates at 1650° C. for 2 min in a hydrogen atmosphere. This resulted in the filling of the pores of the tungsten matrix with emission materials.

Finally, the cathodes were ultrasonically washed in water to remove residual impregnates at the surface of the cathodes and then fired at 1000° C. under dry hydrogen for 20 min to remove remaining absorbed water and decompose any barium hydroxide and carbonate formed in the pores.

After the cathodes were impregnated with barium calcium aluminate, they were kept in a controlled environment, (i.e., vacuum or dry nitrogen), because the emission material was soluble in water and therefore exposure to air had to be limited. In addition, any contamination after impregnation will lead to poor emission performance of the cathode and needed to be avoided.

Example 4

The emission properties of the final cathode structure produced in Example 3 were tested and the microstructure was evaluated using scanning electron microscopy and the distribution of elements was determined by energy dispersive spectrometry (EDS). The phase was characterized by X-ray diffraction (XRD).

The XRD patterns of the $Sc_2O_3$-added tungsten matrix powder that was produced after hydrogen reduction indicated that the powder is only composed of both tungsten and scandium oxide. The SEM images of the initial tungsten powder identified large and small particles. The EDS analysis indicated that the large particles in the powder were tungsten, and the small particles with around 50-nm size are scandia. The tungsten particles were between 1 μm to 2 μm in size, and they have spherical shape and the particle distribution was observed to be very uniform, without any agglomeration.

In comparison, standard commercial tungsten powder used for making dispenser cathodes have particles that are angular and irregularly shaped with a wide distribution of sizes between submicrometer and more than 15 μm in size. Typical commercial tungsten powders have at least 90% of the particles between 2 μm and 14 μm in size and the average particle size varying between 6 μm and 9 μm.

The quality of the porous cathode matrix is mainly determined by the tungsten grain size, shape, and particle distribution. The very uniform 1 µm to 2 µm particles of tungsten covered with nanoscandium oxide that were produced assures the high quality of the tungsten matrix, which is of ultimately important in the uniformity and density of the electron emission.

The analysis verified that control over the parameters of the sol-gel process allowed control over the tungsten and scandia particle size, shape and distribution as well as control over the size and uniformity of the porous microstructure of the matrix.

Cathodes made with a scandia-mixed matrix using standard commercial tungsten powder and impregnated were also compared with cathodes made with the $Sc_2O_3$ tungsten matrix produced in Example 3.

In the scandia-mixed matrix, impregnated, and top-layer thinfilm scandate cathodes made by using standard commercial tungsten powder, the porous matrix was composed of pores that were a few micrometers in diameter and an average interpore distance of around 6 µm.

In contrast, the cathode matrix that was made by using 1 µm to 2 µm tungsten powder with nanosize scandia had average tungsten grain sizes of around 2 µm to 3 µm and scandia grain sizes of less than 100 nm. The nanometer-scale $Sc_2O_3$ grains were uniformly dispersed in the porous matrix. The porosity of the matrix measured by a mercury intrusion-method is 25% with very uniform distribution, and the median pore diameter (volume) was 672 nm. The homogenous porous microstructure of this kind of matrix could improve the distribution of barium-calcium aluminate active materials in the tungsten matrix. Uniform tungsten grain and homogeneous nanopore distribution in the cathodes also resulted in emission uniformity since the active species rapidly spreads on the tungsten grains, yielding uniform Ba—Sc—O coverage. The uniform scandium distribution in the pores also assists with a high rate of electron resupply (i.e., low surface work function) and a well distributed electron emission.

From the discussion above it will be appreciated that the technology described herein can be embodied in various ways, including the following:

1. A method of fabricating a refractory metal scandate nanocomposite powder for cathodes, the method comprising: (a) forming a solution of a refractory metal salt and a solvent to form a metal salt solution; (b) forming a solution of a scandium nitrate and a solvent to form a scandium solution; (c) combining the a metal salt solution and the scandium solution with citric acid and ethylene glycol to form a gel; (d) heating and drying the gel until it forms a solidified gel; and (e) pulverizing the solidified gel to form a produced metal scandate nanocomposite powder.

2. The method of any preceding embodiment, wherein the refractory metal is a metal selected from the group of metals consisting of tungsten, molybdenum, niobium, tantalum and rhenium.

3. The method of any preceding embodiment, further comprising: controlling scandate concentration of the produced powder by controlling scandium nitrate concentration of the scandium solution.

4. The method of any preceding embodiment, further comprising: controlling heating temperature and duration of the gel to control particle size.

5. The method of any preceding embodiment, further comprising: reducing the produced powder by heating the produced powder in a hydrogen atmosphere; pressing the produced powder into a desired cathode shape by applying pressure; and sintering the pressed cathode.

6. The method of any preceding embodiment, wherein the powder is pressed to form a cathode with an average porosity between about 15% and about 35%.

7. The method of any preceding embodiment, further comprising: impregnating the pressed cathode with an electron emissive material.

8. The method of any preceding embodiment, wherein the electron emissive material is a material selected from the group of barium oxide, strontium oxide and barium calcium aluminates.

9. The method of any preceding embodiment, further comprising: mildly sintering the pressed cathode at a temperature below 1000° C.; impregnating the pressed cathode with an electron emissive material; and sintering the impregnated cathode at a temperature greater than 1500° C.

10. A method of fabricating tungsten scandate nanocomposite powder for cathodes, the method comprising: (a) mixing deionized water with ammonium meta tungstate to form a first solution; (b) mixing deionized water with scandium nitrate to form a second solution; (c) combining the first solution and the second solution to form a third solution; (d) adding citric acid and ethylene glycol to the third solution to form a fourth solution; (e) heating and stirring the forth solution until it becomes a gelatinized material; (f) heating and drying the gelatinized material until it forms a solidified gel; (g) crushing the solidified gel into a fine flour-like powder; and (h) heating and drying the powder to form a produced powder.

11. The method of any preceding embodiment, further comprising: placing the produced powder into a vacuum or nitrogen atmosphere to protect it from oxidation and water absorption; reducing the produced powder by heating the produced powder in a hydrogen atmosphere; and pressing the produced powder into a desired shape by applying pressure.

12. The method of any preceding embodiment, wherein about 20 g of nanocomposite 5% scandate tungsten powder is formed from about 25.468 grams of ammonium meta tungstate, about 3.366 grams of scandium(III) nitrate, and about 10 grams to about 30 grams of citric acid.

13. The method of any preceding embodiment, wherein the weight of the scandium(III) nitrate can be adjusted accordingly to achieve a lower or higher percentage of scandia in the final powder.

14. The method of any preceding embodiment, wherein the percentage of scandia in the produced powder is between about 2% and about 8% by weight.

15. A method of fabricating tungsten scandate nanocomposite powder for cathodes, the method comprising: (a) obtaining the following materials: (i) about 25.468 grams of ammonium meta tungstate $[(NH_4)_6H_2W_{12}O_{40}]$; (ii) about 3.366 grams of scandium(III) nitrate $[Sc(NO_3)_3]$; and (iii) about 10 grams to about 30 grams of citric acid $[C_6H_8O_7]$; (b) mixing about 100 ml to about 300 ml of deionized water with the ammonium meta tungstate and stirring the mixture to form a first solution; (c) mixing about 20 ml to about 200 ml of deionized water with the scandium nitrate and stirring the mixture to form a second solution; (d) combining the first solution and the second solution in a flask to form a third solution; (e) stirring the third solution while adding citric acid and ethylene glycol until well mixed; (f) placing the flask into an oil bath and heating the bath at temperatures ranging between about 70° C. to about 150° C., and continuing to stir the third solution during this process for about 15 hours or until the third solution becomes a gelatinized material; (g) placing the gelatinized material into an air vented oven at temperatures ranging from about 140° C. to about 200° C. for about 2 hours to about 6 hours to form a solidified gel; (h) removing the solidified gel from the flask and crushing it into a fine flour-like powder; (i) placing the crushed powder into an air vented oven at temperatures ranging from about 400° C. to about 600° C. for about 2 hours to about 6 hours to form a produced powder; and (j) placing the produced powder into a vacuum or nitrogen atmosphere to protect it from oxidation and water absorption.

16. The method of any preceding embodiment, wherein about 20 g of nanocomposite 5% tungsten scandate powder is formed.

17. The method of any preceding embodiment, further comprising: reducing the produced powder in a hydrogen atmosphere oven by holding the temperature range at about 500° C. to about 800° C. for about 1 hour to about 3 hours followed by an additional about 1 hour to about 3 hour hold time at temperatures ranging between about 800° C. and about 1,000° C.; and pressing the produced powder into a desired shape by applying pressure ranging between about 1 ton/cm$^2$ to about 3 ton/cm$^2$ assuring that average pellet porosity is between about 20% and about 35%.

18. The method of any preceding embodiment, wherein about 20 g of nanocomposite 5% tungsten scandate powder is formed from about 25.468 grams of ammonium meta tungstate, about 3.366 grams of scandium(III) nitrate, and about 10 grams to about 30 grams of citric acid.

19. The method of any preceding embodiment, wherein the weight of the scandium(III) nitrate can be adjusted accordingly to achieve a lower or higher percentage of scandia in the final produced powder.

20. The method of any preceding embodiment, wherein the percentage of scandia is between about 2% and about 8% by weight.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of fabricating tungsten scandate nano-composite powder for cathodes, the method comprising:
    (a) obtaining the following materials:
        (i) about 25.468 grams of ammonium meta tungstate $[(NH_4)_6H_2W_{12}O_{40}]$;
        (ii) about 3.366 grams of scandium(III) nitrate [Sc$(NO_3)_3$]; and
        (iii) about 10 grams to about 30 grams of citric acid $[C_6H_8O_7]$;
    (b) mixing about 100 ml to about 300 ml of deionized water with the ammonium meta tungstate and stirring the mixture to form a first solution;
    (c) mixing about 20 ml to about 200 ml of deionized water with the scandium nitrate and stirring the mixture to form a second solution;
    (d) combining the first solution and the second solution in a flask to form a third solution;
    (e) stirring the third solution while adding the citric acid and ethylene glycol until mixed;
    (f) placing the flask into an oil bath and heating the bath at temperatures ranging between about 70° C. to about 150° C., and continuing to stir the mixed third solution during this process for about 15 hours or until the third solution becomes a gelatinized material;
    (g) placing the gelatinized material into an air vented oven at temperatures ranging from about 140° C. to about 200° C. for about 2 hours to about 6 hours to form a solidified gel;
    (h) removing the solidified gel from the flask and crushing it into powder;
    (i) placing the crushed powder into an air vented oven at temperatures ranging from about 400° C. to about 600° C. for about 2 hours to about 6 hours to form a produced powder; and
    (j) placing the produced powder into a vacuum or nitrogen atmosphere to protect it from oxidation and water absorption.

2. The method of claim 1, wherein about 20 g of nanocomposite 5% tungsten scandate powder is formed.

3. The method of claim 1, further comprising:
    reducing the produced powder in a hydrogen atmosphere oven by holding the temperature range at about 500° C. to about 800° C. for about 1 hour to about 3 hours followed by an additional about 1 hour to about 3 hours hold time at temperatures ranging between about 800° C. and about 1,000° C.; and
    pressing the produced powder into a desired shape by applying pressure ranging between about 1 ton/cm$^2$ to about 3 ton/cm$^2$ assuring that average pellet porosity is between about 20% and about 35%.

4. The method of claim 1, wherein about 20 g of nanocomposite 5% tungsten scandate powder is formed from about 25.468 grams of ammonium meta tungstate, about 3.366 grams of scandium(III) nitrate, and about 10 grams to about 30 grams of citric acid.

5. The method of claim 1, wherein a percentage of scandia in the produced powder is between about 2% and about 8% by weight.

6. The method of claim 1, further comprising:
    reducing the produced powder by heating the produced powder in a hydrogen atmosphere;
    pressing the produced powder into a desired cathode shape by applying pressure; and
    sintering the pressed cathode.

7. The method of claim 6, wherein said powder is pressed to form a cathode with an average porosity between about 15% and about 35%.

8. The method of claim 6, further comprising:
    impregnating the pressed cathode with an electron emissive material.

9. The method of claim 8, wherein said electron emissive material is a material selected from the group of barium oxide, strontium oxide, and barium calcium aluminates.

10. The method of claim 6, further comprising:
sintering the pressed cathode at a temperature below 1000° C.;
impregnating the pressed cathode with an electron emissive material; and
sintering the impregnated cathode at a temperature greater than 1500° C.

\* \* \* \* \*